United States Patent [19]

Felton et al.

[11] Patent Number: 4,623,438

[45] Date of Patent: Nov. 18, 1986

[54] ELECTRET MAKING PROCESS USING CORONA DISCHARGE

[75] Inventors: Clinton D. Felton, Charlotte; Baylor D. Gibson, Waxhaw; Charles E. Jamison, Charlotte; William O. McWhorter, Monroe; George A. Serad, Charlotte, all of N.C.

[73] Assignee: Celanese Corporation, New York, N.Y.

[21] Appl. No.: 550,069

[22] Filed: Nov. 8, 1983

[51] Int. Cl.[4] ............................................. C07C 3/24
[52] U.S. Cl. ........................................ 204/168; 428/397
[58] Field of Search .................... 428/224, 234, 397; 204/168

[56] References Cited

U.S. PATENT DOCUMENTS 4,308,223  3/1980  Stern ................................... 264/22
4,375,718  3/1981  Wadsworth ........................... 29/592

Primary Examiner—Marion C. McCamish
Attorney, Agent, or Firm—Forrest D. Stine

[57] ABSTRACT

Continuous processes for the preparation of electrets and the products produced thereby, including filter fabrics, are disclosed. The process employs a continuous film or continuous filaments in the form of a tightly packed warp having a warp density as determined by light transmission of not more than 40%. The continuous film or continuous filament in the form of a tightly packed warp are continuously fed one or more times through a corona charging station having electrodes disposed on both sides of the material being treated, the material being treated being simultaneously heated while being subjected to a corona discharge of from 6 KV to 20 KV direct current.

6 Claims, 5 Drawing Figures

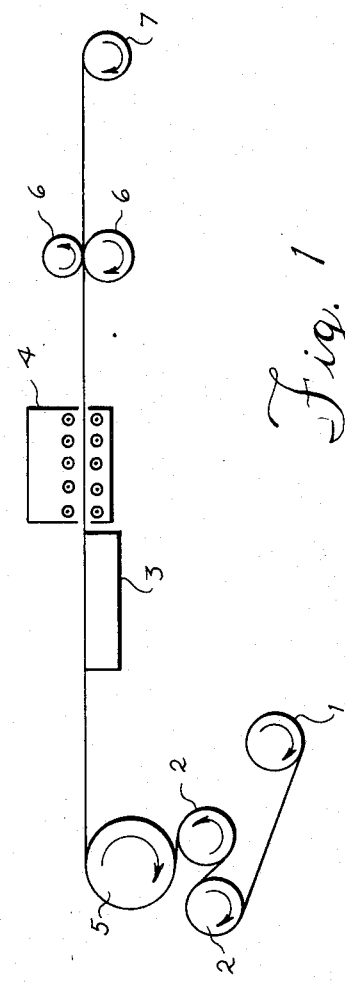
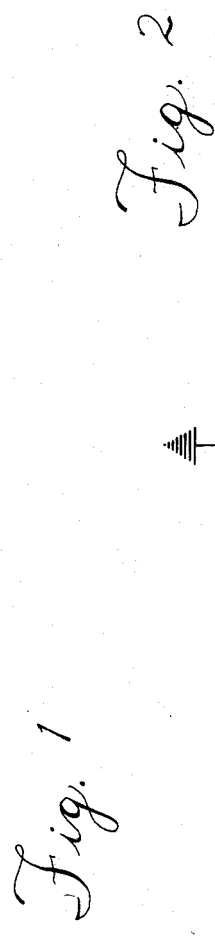
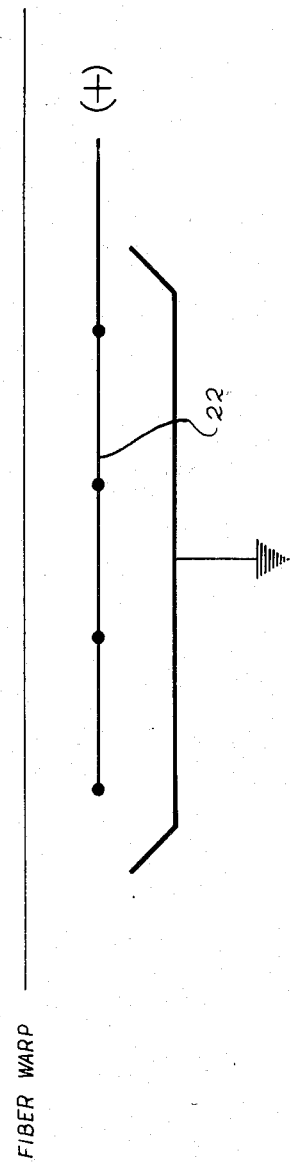

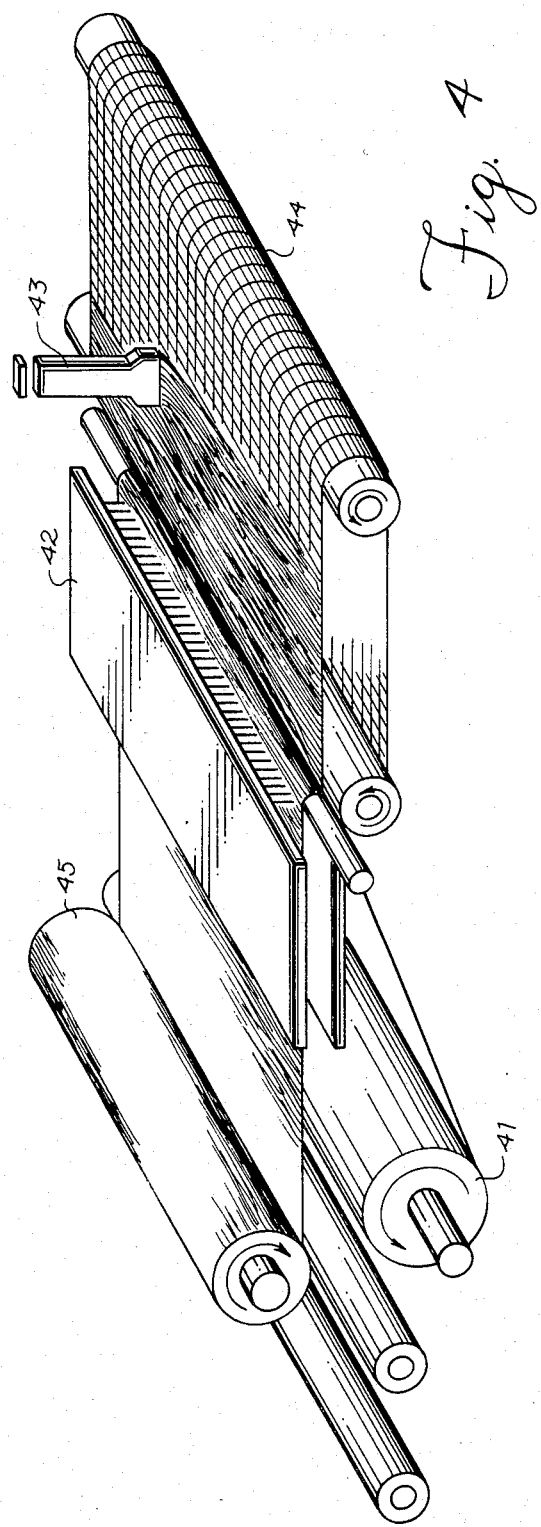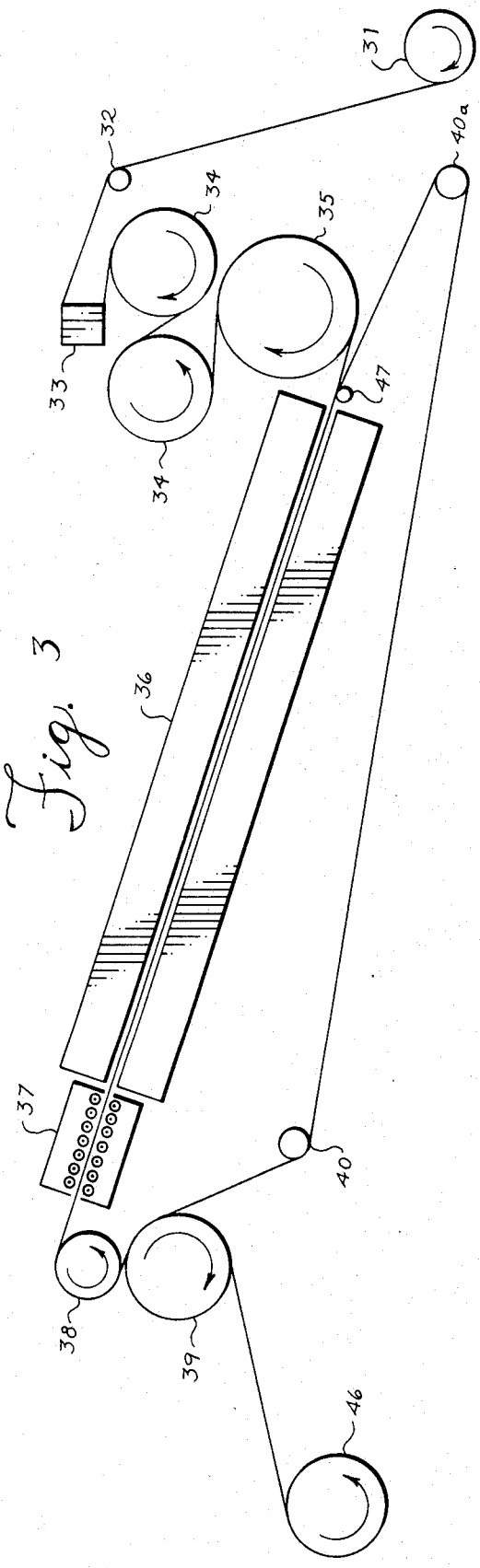

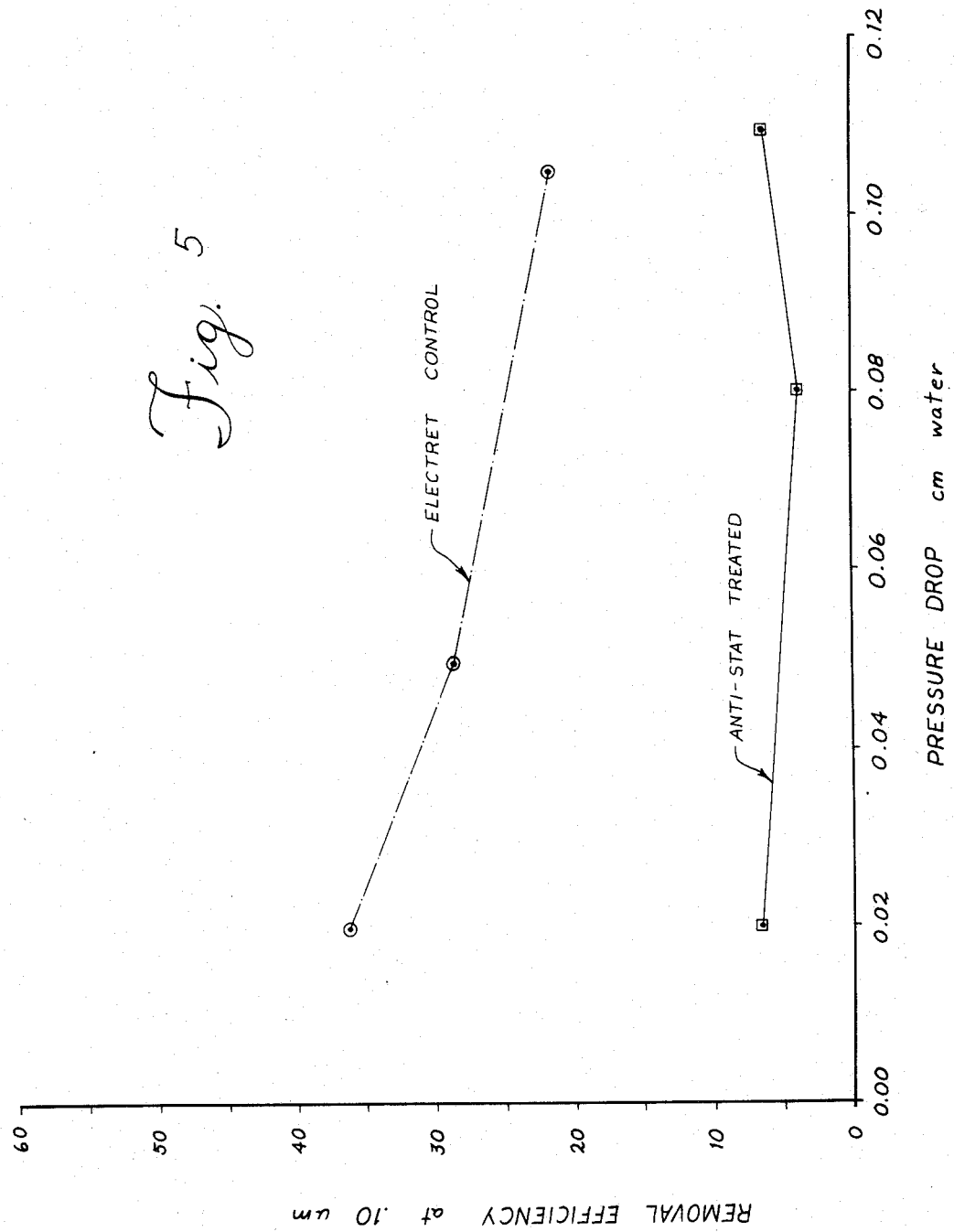

ELECTRET MAKING PROCESS USING CORONA DISCHARGE

This invention relates to a method for manufacturing electrets and the product produced thereby, and more specifically to a high speed continuous process for the manufacture of electrets from continuous film or continuous filament yarns.

It is known that certain dielectric materials can be permanently electrostatically polarized. These materials are polarized by, (1) exciting the material by heating, (2) applying a high-voltage electric field, and (3) cooling the material while under the influence of the electric field. Upon removal of the electric field, appropriate dielectric materials will be found to have become the electrical analog of a permanent magnet. A dielectric becomes an electret when the rate of decay of the field-induced polarization can be slowed down so much that a significant fraction of the polarization is preserved long after the polarizing field has been removed.

Early methods for the formation of fibrous electrets from thermoplastic films or filaments involved disposing the thread or filaments in an electrostatic field established between parallel closely spaced electrodes. This process, which is disclosed in U.S. Pat. No. 2,740,184, heats the thread or filamentary material to soften it and then cools the material in the presence of the electrostatic field whereupon charges are introduced into the fibers. The voltage employed in charging the material is 4000 volts or more of direct current. The filamentary material itself is a hollow filamentary material having a wax core such as carnauba wax, the resultant product being described as having a "more or less permanent charge". In order to produce that degree of permanence of charge in a non wax electret, such as for instance a polyolefin electret, it has been found that substantially higher voltages must be employed, that is to say direct current voltages in the range of 8000 volts or more. When such higher voltages are employed, the electret field will break down and arcing will occur in the free air space surrounding the single fiber or filamentary material employed according to the teachings of U.S. Pat. No. 2,740,184.

Arcing produced from high voltages, that is to say voltages of 8000 volts direct current or higher, may be circumvented by covering the electrodes with a poorly conductive material so as to evenly distribute the applied voltage and dampen possible dielectric breakdown. For instance, U.S. Pat. No. 3,571,679 discloses a process for forming electrets by closely winding a monofilament fiber such as a polypropylene fiber on a hollow winding roller which has been previously surfaced with a polyamide faced aluminum foil. Subsequent to winding the layer of fibers, a second polyamide faced aluminum foil is wound about the yarn layer. The fiber and foil wound roll is then disposed between two electrodes where it is polarized for three hours at a temperature of about 120° C. with a voltage of 200 volts. This method, however, is discontinuous and extremely slow in that charging times of about three hours for the wrapped roll are required.

As a result of such deficiencies, electrets are now currently commonly produced by either a spray spinning technique such as that set forth in U.S. Pat. No. 4,215,682 wherein an electric charge is introduced into melt blown fibers during the melt-blowing process, or alternatively, the electrets are prepared from a film which is homopolarly charged and subsequently fibrillated (see U.S. Pat. No. 3,998,916). It is readily apparent however, that neither spray spun materials nor fibrillated materials can achieve the fidelity of filament cross section which is inherent in continuous filament yarns. Moreover for certain applications, the unique cross sections which are readily available in continuous filament yarns provide vastly improved results such as for instance, in filtration applications.

Alternatively, techniques have been set forth for imparting a permanent electrostatic charge to a preformed mat or web, examples of which are shown in U.S. Pat. Nos. 4,308,223 and 4,375,718. In U.S. Pat. No. 4,308,223, a preformed mat is subjected to a strong electric field while the mat is maintained at a temperature above the glass transition temperature of the fibrous material of the mat. The mat is treated while positioned between two metallic base plates, one of which has a dielectric film thereon and the second of which having high density corona discharge points extending therefrom. Similarly, U.S. Pat. No. 4,375,718 treats a preformed web so as to produce a permanent dielectric charge. The web, which is made of nonconductive thermoplastic fibers, is contacted on each side with a more conductive web to form a combined web which is corona charged for extended periods of time at room temperatures. The treatment of webs however, is an inherently slow process and moreover, the web being treated must have sufficient density to trap the corona charge, thus inhibiting the preparation of lightweight woven or nonwoven constructions.

It is therefore an object of this invention to provide a high speed, high voltage continuous process for the preparation of electrets from continuous films or filaments.

It is another object of this invention to provide a high speed, multiple pass, high voltage continuous process for the preparation of electrets.

It is still another object of this invention to provide continuous filament electrets having novel cross sections and enhanced air filtration properties.

It is a further object of this invention to provide lightweight woven and non-woven webs containing continuous filament electrets.

It is still another object of this invention to provide electret air filters having improved efficiency and durability.

In accordance with this invention, it has now been discovered that it is possible to inject a permanent high level charge into continuous films or filaments at high production rates. The process employs a continuous film or continuous filaments in the form of a tightly packed warp having a high warp density as determined by light transmission of not more than 40%.

Continuous film or continuous filament in the form of a tightly packed warp are fed one or more times through a corona charging station having electrodes disposed on both sides of the material being treated, the material being treated being simultaneously heated while being subjected to the corona discharge of from 6 KV to 20 KV direct current and preferably 10 KV to 20 KV direct current. Preferably, the material being treated is subjected to a plurality of corona discharge cycles. Temperature in the corona zone can be varied from ambient to 150° C. Draw in the corona zone can range from none to 3× (or higher), depending on the state of the fiber being treated. However, the more stable, longer-lived electrets are generally produced at the higher voltages (10 KV to 20 KV) and at elevated temperatures of about polymer glass transition temperatures. Some tensioning while in the corona discharge zone also enhances trapping. Combinations of these conditions result in stable charges of greater than $10^{-9}$ coulomb per gram. Preferably, the material being treated is a continuous filament yarn and most preferably a polypropylene continuous filament yarn having a high surface area cross section such as a trilobal or bar cross section, and most preferably, a trilobal cross section having pronounced concavities. The invention is also related to filters manufactured from the electrets of this invention. These filters differ from prior art electret filters in that they are lightweight filters which have improved filtering action due to improved uniformity, enhanced mechanical filtering action, and greater control over the electrical field surrounding the individual electrets.

For purposes of this invention, a tightly packed warp having a warp density sufficient to result in light transmission of not more than 40% is determined by the following test:

Yarn ends positioned as they are at the corona charging station are wrapped around glass slides, taped at the edges and then removed from one side by slicing with a razor blade. By using a photometric microscope 40×object, 5× eyepiece, 20 light transmission readings are made across the warp. The average value of the 20 readings constitutes the percent light transmission value which has a direct correlation to warp density.

While polypropylene yarn or film is preferred for purposes of this invention, it should be understood that other polymers may also be employed such as, halogenated polyesters, polyethylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. These polymers in fiber or film form should generally have a percent crystallinity of at least 20 percent, preferably at least 30 percent, and most preferably about 50 percent to 90 percent or higher. The polymer compound should not contain conductive additives that would reduce the resistivity and drain the charge. For instance, polypropylene with volume resistivity values of $10^{14}$ ohm cm or greater should be employed.

Fiber cross section, size and shape are important parameters for enhanced electrostatic filtration because charge density is dependent on surface geometry. It increases with decreasing radius of curvature. Since the electric field is proportional to charge density, it will also reach higher values in the vicinity of smaller curvature radii. Consequently, electric field strength can be increased symmetrically for round fibers by decreasing the diameter. However, as there are finite limits on how small a fiber can be spun, it is more practical to assymetrically increase field strength by altering cross section shape. For example, a trilobal or bar cross section will have extremely high charge densities at the apexes due to their sharp radii. In these areas, strong electric fields are generated that are more effective in the electrostatic filtration of particulates. Additionally, for the same cross sectional area, the trilobal or bar cross section will have higher surface area than the round cross section fiber. This means that mechanical filtration will be improved as well.

As previously noted, the electrets of this invention are especially suitable for use in lightweight filter fabrics and more specifically lightweight needle punched filter fabrics having a total weight of less than 16 ounces per square yard. The lightweight needle punched fabrics of the instant invention are preferably prepared by needle punching electret trilobal or bar cross section continuous filament fibers into a scrim fabric such as a polyester scrim having a weight of 0.5 ounces per square yard. A wide variety of needle punch apparatus is suitable for purposes of this invention. Needle punch apparatus manufactured by Dilo Maschinen Fabrik, Eberbach, West Germany has been found to be especially suitable.

A better understanding of the invention may be had from a discussion of the drawings wherein:

FIG. 1 is a schematic illustration of a single pass embodiment of the corona charging process of the instant invention.

FIG. 2 is a schematic illustration of the corona charging station of FIG. 1.

FIG. 3 is a schematic illustration of a double pass embodiment of the corona charging process of the instant invention.

FIG. 4 is a projected illustration of apparatus suitable for the preparation of a light weight electret filter fabric.

FIG. 5 is a graph plotting removal efficiency against pressure drop for light weight filter fabrics.

Turning to FIG. 1 of the drawings, a schematic illustration is set forth of one form of apparatus suitable for the preparation of the electrets of this invention. In operation, a warp beam 1 of continuous filament yarn is fed across a pair of heated rollers 2 maintained at temperatures of from 120° to 135° C. The heated warp of continuous filament yarn is then drawn on draw roll 5 to maximum elongation and then passed across hot shoe 3 and into corona charging station 4, the yarn being secured between nip rolls 6 whereby substantially all drawing of the yarn takes place prior to entry of the yarn into corona charging station 4. The charged warp of continuous filament yarn is then taken up on take-up roll 7.

The preferred apparatus of the instant invention is illustrate schematically in FIG. 3 of the drawings. In operation of a warp beam or continuous film 31 is passed over guide bar 32 through tensioning device 33 and about a pair of heated rolls 34. The heated warp beam or film 31 is then passed about draw roll 35 through oven member 36 and then into corona charging station 37. Warp beam or film 31 exiting corona charging station 37 is then passed about upper draw roll 38 through the nip formed by lower draw roll member 39 and over idler roll member 40. From idler roll member 40 the warp beam or film 31 passes over idler roll member 40a and thence over guide bar 47 and back into oven member 36 and thence into corona charging station 37. Passage of the yarn warp or film 31 through corona charging station 37 is repeated a plurality of times after which the yarn warp beam or film is withdrawn over lower draw roll member 39 to take-up beams 46.

A more detailed view of the corona charging station of FIGS. 1 and 3 may be seen in FIG. 2 of the drawings. Grids 21 and 22 are connected to high DC voltage power supplies. Grids 21 and 22 are composed of thin tungsten wires separated by an air gap of approximately 25 millimeters. By passing a fiber warp or film intermediate between grids 21 and 22 while applying a total voltage differential of from 6 KV to 20 KV from grid 21 to grid 22, a charge is injected into a fiber warp by the resulting corona field. It should be understood that the grids 21 and 22 may both have a common charge, that is to say both negative or both positive. In any event, the charge has a high degree of permanence. For example, an olefinic fiber warp single pass corona charged under these conditions retained a charge of greater than $10^{-9}$ coulombs per gram after 400 days. For multi pass corona charge applications to a fiber warp or film, the charge life is even greater.

The following specific examples are given for purposes of illustration and should not be considered as limiting the spirit or scope of this invention.

EXAMPLE I

A warp of 60 ends of polypropylene round cross section yarn 7.5 denier per filament (1500 total denier/200 Fils yarn) which had been subjected to a draw ratio of 1.25 to 1 is processed on an apparatus substantially as illustrated in FIG. 1 of the drawings. Heated rolls 2 are operated at 14 feet per minute at 132° C., the warp beam after passage over the heated rolls being passed about draw roll 5 operated at a speed of 31 feet per minute so as to produce a draw ratio of 1.25 to 1 and then across hot shoe 3, maintained at a temperature of 125° C. The yarn is then passed into corona station 4 wherein the top electrode was charged with a negative charge of six kilovolts direct current and the bottom electrode was charged with a positive charge of six kilovolts direct current. Nip rolls 6 are operated at 29 feet per minute and take-up roll 7 is also operated at 29 feet per minute.

The decay of the charge of the electret of Example I is tested by measuring the surface voltage with a Monroe isoprobe electrostatic volt meter and using the relationship between charge and surface voltage ($Q=CV$, where Q is charge, C is capacitance, and D is surface voltage) to calculate the effective surface charge density. The effective surface charge density is found to be greater than $10^{-9}$ coulombs per gram, which is equal to a surface voltage of not less than about 250 volts.

EXAMPLE II

The process of Example I is repeated except that a warp of 150 ends of polypropylene trilobal cross section yarn of 6.0 denier per filament is processed. The effective surface charge density is found to be greater than $10^{-9}$ coulombs per gram, which is equal to a surface voltage of not less than about 250 volts.

EXAMPLE III

The process of Example I is repeated except that draw roll 5 is operated at a speed of 29 feet per minute so that the warp is not being drawn while subjected to corona discharge. The effective surface charge density is found to be greater than $10^{-9}$ coulombs per gram which is equal to a surface voltage of not less than about 250 volts.

EXAMPLE IV

The process of Example I is repeated except that a tight packed warp of yarn made from a copolymer of tetrabromobisphenol-A and 40/60 iso-terephthalic acid monomers having round cross section and 1.5 denier per filament is employed. The effective surface charge density is found to be greater than $10^{-9}$ coulombs per gram, which is equal to a surface voltage of not less than about 250 volts.

EXAMPLE V

A warp of 853 undrawn denier 72 fil polypropylene round cross section yarn is strung up as illustrated in FIG. 3 of the drawings, the warp passing 10 cycles through the oven and corona charging stations, employing the following conditions:
Hot Rolls—125° C.
Oven—140° C.-145° C.
Corona Station—
    Top Electrode—(−) 10 KVDC
    Bottom Electrode—10 KVDC
1st Draw Roll—75 feet per minute
2nd Draw Roll—116 feet per minute
Draw Ratio—3.88

Surface voltage, as determined with the Monroe isoprobe voltmeter 3 days later, is found to be (−) 843 volts. Half-life temperature as determined by TSCD (Thermally Stimulated Charge Decay) is found to be 131° C. This is indicative of deeptraps being filled and a long-lived (about 2-4 years) electret.

EXAMPLE VI

A warp of 300 denier 70 fil trilobal polypropylene yarn is strung up as shown in FIG. 3 of the drawings with the following conditions being employed:
Cycles—10 to 40
Hot Rolls—15 feet per minute at 100° C.
Draw Rolls—28 feet per minute at ambient
Oven—115° C.
Draw Rolls 2—42 feet per minute at ambient
Corona Station—
    Top Electrode (−) 5000 VDC
    Bottom Electrode (−) 5000 VDC Initial average surface voltages, as determined with the Monroe Isoprobe electrostatic voltmeter is found to be as follows.
10 cycles—(−) 1046 volts
20 cycles—(−) 1475 volts
30 cycles—(−) 1514 volts
40 cycles—(=) 2244 volts

EXAMPLE VII

A warp of 600 denier 400 fil round section brominated aromatic polyester yarn is strung up as illustrated in FIG. 3 of the drawings with the following conditions being employed:
Cycles—17
Rolls—All at 30 feet per minute
Hot Rolls—125° C.
Oven—120° C.
Corona Station—
    Top Electrode—(−) 900 VDC
    Bottom Electrode—(−) 9000 VDC Average surface voltage is found to be (−) 1622 volts after 4 days, indicative of a permanent electret charge.

EXAMPLE VIII

A one-quarter inch wide polypropylene film having a thickness of one mils, the film being prepared according to the process set forth in U.S. Pat. No. 3,679,538 is strung up as illustrated in FIG. 2 of the drawings, employing conditions substantially as follows:

Cycles—10
Hot Rolls—10 feet per minute at 115° C.
Draw Rolls 1—25 feet per minute
Draw Rolls 2—29 feet per minute
Oven—140° C.
Corona Station—
    Top Electrode (−) 6000 VDC
    Bottom Electrode (+) 6000 VDC At the beginning of the TSCD method, the surface voltage is found to be (−) 842 VDC and half-life temperature is found to be 79° C.

EXAMPLE IX

The process of Example VIII is repeated except that a polyethylene film is employed.

At the beginning of the TSCD method, the surface voltage is found to be (−) 1300 VDC and half-life temperature is found to be 92° C.

As can be seen from Examples V to IX which are representative of the multi pass corona charging process of the instant invention, a higher surface voltage is obtained than can be produced by the single pass method as represented by Examples I to IV. Example VI is illustrative of the increased charge obtained by increasing the number of cycles. It is assumed that shallow charges are thermally detrapped and deep charging is increased by means of multiple corona charging passes. A detailed description of the deep charging theory appears in "The Use of Polymers for Electrets" by J. Van Turnhout, Journal of Electrostatics (1975) 147-163.

As previously mentioned, the electrets of the instant invention may be processed into lightweight filters by means of needle punch apparatus. Turning to FIG. 4 of the drawings, a schematic illustration is set forth of the preparation of a needle punched lightweight electret filter. In FIG. 4, a scrim 41 is fed from a feed roll under needle plate member 42. Electret continuous filament is fed from a traversing aspirating air jet member 43 onto meshed belt member 44. Continuous filament laid by means of traversing air jet member 43 is fed from meshed belt member 44 beneath the needle members of needle plate member 42 and needle punched into scrim 41 which is also fed beneath the needle member of needle plate member 42. Filament is then punched into scrim 41 to produce filter batting which is taken up on roll member 45.

The following specific example is set forth for purposes of illustration.

EXAMPLE A

The round cross section negatively charged polypropylene electret yarn of Example V is tufted into a 0.5 ounce per square yard polyester baby diaper scrim fabric by means of a Dilo Maschinen Fabrik, of Eberbach, West Germany needle punch machine. The final weight of the needle punched fabric is 3.8 ounces per square yard.

EXAMPLE B

The round cross section negatively charged yarn of Example V is plied with a yarn prepared according to Example V except that the top and bottom electrodes are given a positive charge of 10 KVDC. The plied yarn is then tufted into a 0.5 ounce per square yard polyester baby diaper scrim fabric by means of a Dilo Maschinen Fabrik of Eberbach, West Germany needle punch machine. The fabric is found to be an effective aerosol filter.

EXAMPLE C

The fabric of Example A having negatively charged electret yarn needle punched into one face is inverted and a yarn prepared according to Example V except that the top and bottom electrode are given a positive charge of 10 KVDC is tufted into the other face of the fabric. Tufting is again conducted by means of a Dilo Maschinen Fabrik of Eberbach, West Germany needle punch machine. The fabric is found to be an effective aerosol filter.

An electrical aerosol analyzer was used to measure aerosol member concentrations. The instrument which is a model 3030 electrical aerosol analyzer manufactured by Thermo Systems, Inc., St. Paul, Minn., draws aerosol at the rate of 50 liters per minute. Filter holders made with circular openings which correspond to face velocities of 5.7, 10.3, and 20.2 centimeters per second when the full flow of the instrument was passed through them were prepared and mounted with needle punched fabrics. Member concentrations for particles in the size range size range of 0.02 to 0.75 $\mu$m with an average value of about 0.10 $\mu$m were measured using a test aerosol by lighting a cigarette and allowing it to burn completely while fan stirring the air. Measurements were taken ten minutes after the cigarette had stopped burning.

The results of the particle removal efficiency test are graphically set forth in FIG. 5 of the drawings wherein the needle punched fabric of Example A is evaluated against (1) an identical needle punched fabric devoid of an electrical charge, the electrical charge having been dissipated by treatment with an antistat comprising a 50% aqueous solution of AY-2000 (antistat manufactured and sold by ICI Americas of Wilmington, Del.) diluted 19 to 1 sprayed on the sample and then allowed to air dry. As can be seen from FIG. 5 of the drawings removal efficiency of 0.10 $\mu$m particles is plotted against pressure drop in centimeters of water.

Pressure drop is pressure difference across the filter as measured by means of a water manometer. The result is expressed in centimeters of water gauge.

The removal efficiency of the electret or charge containing fabric is significantly higher at all face velocities and corresponding pressure drops than the identical needle punched fabric wherein the charge was removed with an antistat. The differential between the samples is most pronounced at low pressure drop. Filter qualities for all samples were based on penetration for 0.1 $\mu$m particles which are fairly representative of the penetration in the 0.1 to about 0.75 $\mu$m range.

What is claimed is:

1. A method for the manufacture of a constant cross-section fiber electret comprising, passing a warp beam of tightly packed synthetic polymeric yarn, said polymeric yarn having a fiber cross-section characterized by apexes such as to produce asymmetric electric field strength, said polymeric yarn being free of additives that would reduce resistivity and having a warp density as determined by light transmission of not more than 40% and subjecting the yarn while in a heated and tensioned condition to a corona discharge of from 6K volts to 20K volts generated by a direct current voltage applied to an upper grid member and a lower grid member.

2. The method of claim 1 wherein said synthetic polymeric yarn is a polyolefinic yarn or a halogenated polyester yarn.

3. The process of claim 2 wherein said olefinic yarn is a polypropylene yarn.

4. The method of claim 1 wherein said synthetic polymeric yarn is a multilobal or bar cross-section yarn.

5. The method of claim 1 wherein said corona discharge is generated by applying a negative charge to one grid member and a positive charge to the other grid member.

6. The method of claim 1 wherein said corona discharge is generated by applying a charge of common polarity to both grid members.

* * * * *